United States Patent [19]

Wally, Jr.

[11] Patent Number: 4,494,867

[45] Date of Patent: Jan. 22, 1985

[54] PIN MOUNTING PLATE FOR VACUUM FILM HOLDERS

[75] Inventor: Joseph H. Wally, Jr., Shawnee Mission, Kans.

[73] Assignee: Opti-Copy, Inc., Lenexa, Kans.

[21] Appl. No.: 514,634

[22] Filed: Jul. 18, 1983

[51] Int. Cl.³ .............................................. G03B 27/60
[52] U.S. Cl. ......................................... 355/73; 355/91
[58] Field of Search ............................... 355/72, 73, 91

[56] References Cited

U.S. PATENT DOCUMENTS

| | | | |
|---|---|---|---|
| 3,115,808 | 12/1963 | Durst | 355/73 |
| 3,645,621 | 2/1972 | Wally | 355/73 |
| 3,762,816 | 10/1973 | Wally | 355/73 |
| 3,771,870 | 11/1973 | Taylor | 355/73 |

Primary Examiner—Monroe H. Hayes
Attorney, Agent, or Firm—Kokjer, Kircher, Bradley, Wharton, Bowman & Johnson

[57] ABSTRACT

In a vacuum film holder, a mounting plate for situating film registration pins at locations coinciding with the vacuum channel which holds the film against the glass pane covering the center of the film holder frame. The plate bridges the vacuum channel and fits partially in a groove formed in the frame and partially in an aligned notch formed in the glass. Locator pins and cooperating diamond-shaped pins on the plate fit in holes drilled through the frame within the groove to assure proper location of the registration pin in coincidence with the vacuum channel. A special tool permits the plate to be easily removed without damaging the glass of the film holder.

19 Claims, 3 Drawing Figures

PIN MOUNTING PLATE FOR VACUUM FILM HOLDERS

BACKGROUND OF THE INVENTION

This invention relates generally to vacuum film holders and more particularly to an arrangement for properly locating the registration pins on a film holding device of the type used in film projection.

In the projection of film images onto an easel, vacuum film holders equipped with registration pins serve to hold the film at precisely the correct location for proper projection. The film holder includes a metal frame and a glass pane which fits in a rectangular opening formed through the frame. The glass pane rests on a recessed shelf or ledge that extends around the frame opening. A thin vacuum channel is formed between the frame and the edge of the glass in order to apply vacuum to the film for holding it flatly against the glass.

Registration pins are of use when successive, congruent images must be individually and separately positioned and exposed to a common sensitive medium so that they become a composite. When unpunched film is passed over the same film holder and vacuumized, the pins cannot be present. Thus it is essential that the pins be made easily and quickly removable and/or replaceable. The present invention provides for this capability.

For economy reasons and to achieve the best possible quality in the finished print, film images are made to cover the greatest possible area on a given piece of film. This means that the space between the edge of the image and the edge of the film is made as narrow as possible even though this area is required to fall over the vacuum channel. The reason is that when in the projection mode, the vacuum channel cannot underlie the image area, lest it show in the finished picture.

Further economies can be achieved if the pins and the film punch holes can be located more or less centering them over the vacuum channel, but this creates a nearly insurmountable difficulty because the pins then block the vacuum channels, preventing the passage and egress of air out through the channels with resultant vacuumizing of the film.

This invention satisfies all the requirements, namely, using pins which can be precisely positioned to match the punched holes in the film, easily installed and easily and quickly removed and configured to obviate blocking the passage of air.

Registration pins are often needed at opposite ends of the frame to interfit with punched film in a manner to maintain the film at the proper location for projection of the film image and to relate successive, preregistered films with respect to the film holder (and the optical axis) in the same attitude. The registration pins are necessary at some times and are not used at other times. When the pins are required, they do not interfere with the film holding function of the device. However, the center to center dimension between the registration pins is sometimes designated and can cause problems if the vacuum channel-to-vacuum channel distance is about the same as the pin-to-pin distance.

For example, on film holders which have a nominal 8 inch image size, current standards call on occasion for a 9 inch center to center dimension between the registration pins. Due to the need for a shelf of about ¼ inch on each end of the holding frame for the glass pane in order to support the glass, the frame opening must be 8½ inches long for a nominal 8 inch aperture size. Adding another ¼ inch at each end for the glass results in coincidence between the registration pins and the vacuum channel. When holes for receiving the pins must be drilled in the frame at locations where they tend to break out into the space of the vacuum channel, the situation is unacceptable from a fabrication standpoint. These problems, coupled with the need to alternately provide and remove the registration pins, have not been successfully dealt with by the industry prior to the present invention.

SUMMARY OF THE INVENTION

The present invention provides an arrangement which permits the registration pins of a vacuum film holder to be positioned in coincidence with the location of the vacuum channel in a vacuum film holder. In accordance with the invention, the ends of the film holder frame are grooved and the ends of the glass panels are notched to align with the grooves. A pair of small metal plates are provided for insertion into the grooves and notches to bridge the vacuum channel without blocking or otherwise obstructing it. The registration pins project from the plates at locations to overlie the vacuum channel. Precise location of the registration pins is assured by providing the plates with locator pins which enter mating holes in the frame when the plates are installed. Diamond pins projecting from the plates enter holes in the frame to cooperate with the locator pins in properly positioning the plate assemblies. When the registration pins are not needed, flat plates without pins are fitted in the grooves and notches to prevent the vacuum from becoming ineffective due to leakage. A special tool facilitates removal of the plates without requiring prying or other activity that could damage the glass.

It is the primary object of the invention to provide an arrangement for mounting registration pins at the location of the vacuum channel in a vacuum film holder.

Another object of the invention is to provide a pin mounting arrangement which does not interfere with the vacuum channel or otherwise hamper proper functioning of the film holder.

A further object of the invention is to provide a pin mounting arrangement which positions the registration pins at the precise locations required to properly register the film.

An additional object of the invention is to provide a pin mounting arrangement which can be quickly installed on and removed from the film holder frame without damaging the glass or any other portion of the device.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views.

Figure 1:
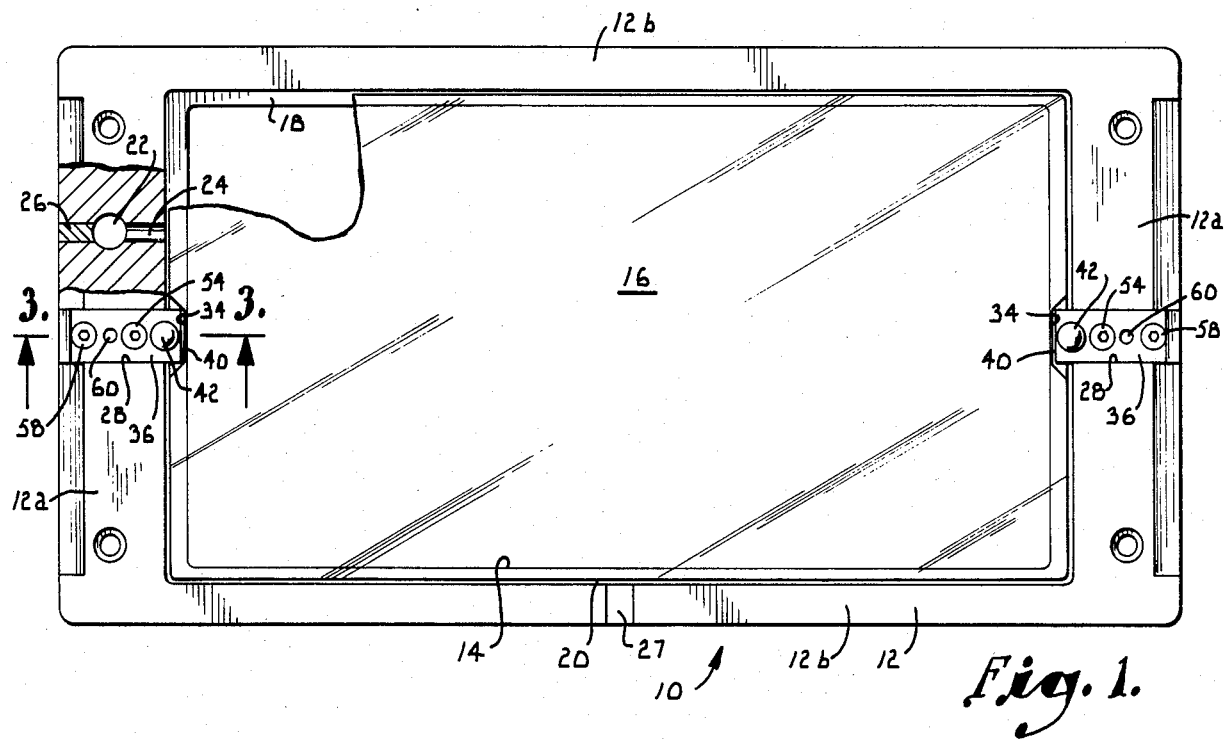
FIG. 1 is a top plan view of a vacuum film holder which is equipped with a pair of pin mounting plates constructed according to a preferred embodiment of the present invention, with a portion of the frame broken away for purposes of illustration.

Referring now to the drawing in more detail, numeral 10 generally designates a vacuum film holder used to hold film having images that are to be projected onto a screen or other surface. The film holder 10 includes a rectangular frame 12 constructed of metal and having opposite ends 12a and opposite sides 12b. A rectangular opening or aperture 14 is formed through the center of the frame 12. A rectangular glass pane 16 covers opening 14 and seats on a ledge or shelf 18 formed on frame 12 to provide a shoulder for receiving the edge portions of the pane. The shelf 18 is recessed below the top surface of frame 12 and extends continuously around the periphery of the opening 14. When the glass pane 16 is properly seated on shelf 18, the top surface of the pane is flush with the top surface of the frame.

The outer edge of pane 16 is spaced inwardly from the main body of frame 12 to provide a continuous vacuum channel 20 around the periphery of the glass and above the shelf 18. As shown in FIG. 1, an opening 22 formed in one end 12a of the frame intersects with a passage 24 leading to connection with the vacuum channel 20. A plug 26 blocks the outside portion of the passage 24. A vacuum line (not shown) can be connected with opening 22 in order to apply vacuum to the vacuum channel 20. The vacuum holds the film flatly against the glass pane 16 so that the film image can be projected through the glass and onto the screen. A sensor slot 27 is formed in one of the sides 12b of the frame. The sensor is an electric eye which stops the roll of film when the image is centered over the aperture 14.

In accordance with the present invention, a transverse groove 28 is formed through each end of frame 12. The depth of each groove 28 is considerably less than the depth of the recessed shelf 18. Each groove 28 is provided with a pair of holes 30 and 32 which are drilled through frame 12 from the bottom of groove 28 to the bottom of the frame. Holes 30 and 32 are spaced apart and parallel to one another, with hole 30 being located closer to the periphery of the frame than hole 32.

Figure 3:
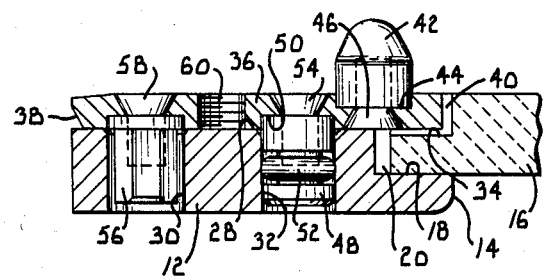
FIG. 3 is a fragmentary sectional view on an enlarged scale taken generally along line 3—3 of FIG. 1 in the direction of the arrows.

Each end of the glass pane 16 is provided at its center with a notch 34. The notches 34 are located immediately above shelf 18 and in alignment with the grooves 28 when the glass pane is seated on the shelf 18. As best shown in FIG. 3, notches 34 are slightly deeper than the grooves 28 and extend to a depth equal to about half the thickness of the pane. Each notch 34 is flared toward the edge of the glass pane 16. The aligned grooves 28 and notches 34 are located adjacent the vacuum channel 20 on opposite sides of it.

Grooves 28 provide recesses in the frame for receiving small metal plates 36. Plates 36 are identical to one another, and one plate is installed at each end 12a of the frame. Plates 36 are rectangular and have flat top and bottom surfaces and beveled corners 38 in order to avoid scratching or otherwise damaging the glass pane 16. Each plate 36 fits partially in one of the grooves 28 and partially in the notch 34 which is aligned with the groove. As best shown in FIG. 3, each plate 36 spans or bridges the vacuum channel 20 while leaving the vacuum channel open below the plate to avoid blocking or otherwise interfering with the vacuum system. Due to the greater depth of notch 34 in comparison to groove 28, each plate 36 is spaced slightly above the bottom of the corresponding notch 34. Also, the end of each plate 36 is spaced slightly away from the base of the notch 34 to provide a clearance space 40 for application of vacuum to the film. The metal plates 36 do not come into contact with glass pane 16 and thus avoid scratching or otherwise damaging the glass.

Each plate 36 has a registration pin 42 projecting above its top surface. The registration pins 42 register with punched openings in the film in order to properly position the film with respect to the glass pane 16. The free end of each registration pin 42 presents a rounded surface for easy impalement of the film openings. Each pin 42 is received in a round recess 44 (FIG. 3) formed in the upper surface of plate 36. A flat head screw 46 is extended into the bottom surface of plate 36 and threaded into the registration pin 42 in order to secure the registration pin to the plate 36. The flat head of screw 46 is flush with the bottom surface of plate 36.

Each plate 36 has a locator pin 48 which serves to properly locate the plate and the registration pin. Locator pin 48 is received in a round recess 50 formed in the bottom surface of plate 36. Pin 48 projects well below the lower surface of plate 36 and carries a rubber O-ring 52 having a slightly larger diameter than hole 32. A flat head screw 54 is extended into the top of plate 36 and threaded into the locator pin 48 in order to secure the locator pin to the plate. O-ring 52 has a slightly larger diameter than hole 32 in order to fit closely in the hole when the locator pin 48 is inserted therein.

The tight fit of O-ring 52 in hole 30 may not always be sufficient to adequately hold the plate 36 seated in groove 28. To assist in this function, the O-ring 52 can be closely fitted in an annular groove in the locator pin, and the hole 32 can be reduced in diameter above the area where the O-ring is received. Alternatively, plate 36 can be held down by one or more hold down screws either threaded through the plate and into frame 12, or flat head screws can be screwed into the frame with the screw heads contacting opposite side edge portions of plate 36 to hold the plate seated in the groove.

Each plate 36 also has a diamond shaped pin 56 which enters hole 30 when the plate is installed in groove 28 and notch 54. The diamond pin 56 projects from the bottom surface of plate 36 and cooperates with the locator pin 48 to assure proper location of the registration pin 42. A flat head screw 58 is extended into the top of plate 36 and threaded into the diamond pin 56 to secure it to the plate. The heads of screws 54 and 58 are flush with the top surface of plate 36 and are provided with recesses 54a and 58a (FIG. 2) for receiving a tool.

The registration pin 42 of each plate 36 is located near the inside end of the plate on the portion of the plate which bridges the vacuum channel 20. The diamond pins 56 are located near the outside ends of the plates, while the locator pins 48 are situated between pins 42 and 56. The screws 46, 54 and 58 permit all of the pins to be detached from the plates 36.

Figure 2:
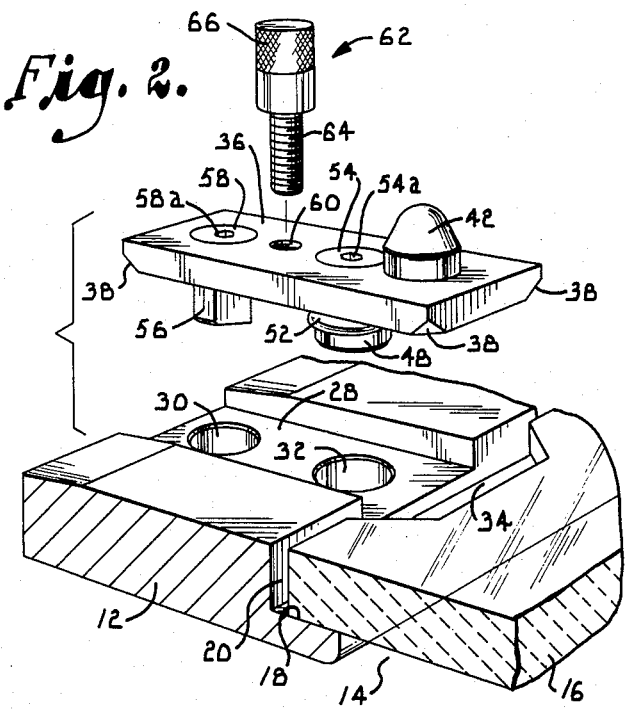
FIG. 2 is a fragmentary exploded perspective view on an enlarged scale showing one of the pin mounting plates and associated parts.

An internally threaded opening 60 is formed through each plate 36 at a location between pins 48 and 56. As shown in FIG. 2, a tool 62 which is used to remove plates 36 from the film holder has an externally threaded shank 64 that can be threaded into and out of opening 60. A knurled head 66 of the tool provides a finger grip for lifting of plate 36 after the tool has been threaded into opening 60. In this manner, the plates 36 can be removed from the film holder without the need to pry them or perform other activity that could cause scratching or other damage to the glass pane 16.

The plates 36 are installed by inserting them into the pairs of aligned grooves 28 and notches 34. The locator pins 48 enter holes 32 to properly locate the registration pins 42. At the same time, the diamond pins 56 enter holes 30 to cooperate with the locator pins in properly positioning the plates. The O-rings 52 should be moistened in order to facilitate their entry into holes 32. The tight fit of the O-rings in openings 32 maintains the plates properly seated partially in grooves 28 and partially in notches 34.

When the plates have been installed, they bridge the vacuum channel 20 and locate the registration pins 42 directly above the vacuum channel, as best shown in FIG. 3. Thus, if requirements dictate that the registration pins be located in coincidence with the vacuum channel 20, the arrangement of the present invention permits the registration pins to be so located without obstructing or otherwise interfering with the application of vacuum to the film which is held by the device. For example, if the opposite end portions of channel 20 are 9 inches apart, the registration pins 42 on the opposite ends of the device can be spaced apart on 9 inch centers if necessary to properly hold the film.

If the registration pins are not needed for a particular application of the film holder, plates 36 are removed, and flat plates without pins (not shown) are inserted in the grooves and notches to prevent the vacuum from becoming ineffective. As previously indicated, each plate 36 can be removed by threading tool 62 into opening 60 and lifting the tool to remove pins 48 and 56 from openings 32 and 30.

It is to be understood that the registration pins 32 can be situated at any selected location on the film holding device 10 by positioning them at the desired location with respect to the locator pins 48.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, what is claimed is:

1. An arrangement for mounting a registration pin at a preselected location on a vacuum film holder having a frame presenting an opening and a recessed shelf around the opening, a transparent panel seating on the shelf to cover the opening, and a vacuum channel extending around the panel for applying vacuum to the film to hold same flatly against the panel, said arrangement comprising:
    means providing a recess in the frame adjacent the vacuum channel;
    a notch in the panel at a location aligned with said recess and adjacent the vacuum channel on the opposite side of the channel from the recess;
    a plate having a size to fit partially in said recess and partially in said notch to bridge the vacuum channel;
    means for mounting the registration pin on said plate to project from one side thereof;
    an aperture in the frame at a location within said recess;
    a locator pin for insertion in said aperture; and
    means for mounting said locator pin on said plate to project from the side thereof opposite said one side at a location to position said registration pin at said preselected location when said plate is inserted in said recess and notch with said locator pin received in said aperture.

2. The invention of claim 1, including:
    a second aperture in the frame at a location within said recess spaced from the first mentioned aperture;
    a pin member for insertion in said second aperture; and
    means for mounting said pin member on said plate to project from said opposite side thereof at a location to enter said second aperture when said plate is inserted in said recess and notch with said locator pin received in said aperture.

3. The invention of claim 1, wherein said preselected location is on the portion of said plate which bridges the vacuum channel.

4. The invention of claim 1, including an O-ring carried on said locator pin and fitting closely in said aperture when the locator pin is inserted therein.

5. The invention of claim 1, including:
    a threaded hole in said plate; and
    a tool having a threaded shank adapted to mate with said threaded hole, said tool having a grip thereon for lifting of the tool to remove said plate from said recess when said shank is threaded into said threaded hole.

6. The invention of claim 1, wherein said mounting means for the registration pin and said mounting means for the locator pin permit detachment of the registration and locator pins from said plate.

7. In a vacuum film holder having a frame, an opening through the frame, a recessed shelf extending around the opening, a transparent panel for seating on the shelf to cover the opening, and a vacuum channel around the panel for application of vacuum to hold film against the panel, the improvement comprising:
    a recess in the frame adjacent the vacuum channel;
    a notch in the transparent panel adjacent the vacuum channel on the opposite side of the channel from said recess, said notch being aligned with said recess when the panel is seated on said shelf;
    an aperture in the frame at a location within the recess;
    a plate adapted to fit partially in said recess and partially in said notch to bridge the vacuum channel;
    a registration pin projecting from one side of said plate; and
    a locator pin projecting from the opposite side of said plate at a location to enter said aperture when said plate is inserted partially in said recess and partially in said notch, said registration pin being disposed at a preselected location for engagement with the film when said plate is inserted partially in said recess and partially in said notch and such locator pin is received in said aperture.

8. The improvement of claim 7, including:

a threaded hole in said plate accessible from said one side thereof; and a tool for use in removing said plate from the recess and notch, said tool having a grip on one end and a threaded shank on the opposite end for threading into said hole to permit the tool to lift the plate out of the recess and notch.

9. The improvement of claim 8, wherein said locator pin is disposed between said registration pin and said threaded hole.

10. The improvement of claim 9, including:

a second aperture in said frame at a location within said recess spaced from the first mentioned aperture; and a pin member projecting from said opposite side of the plate at a location to enter the second aperture when said plate is inserted partially in said recess and partially in said notch and said locator pin is received in said first aperture.

11. The improvement of claim 10, wherein said threaded hole is located between said locator pin and said pin member.

12. The improvement of claim 7, including a pair of screws for attaching said registration and locator pins to said plate in projection therefrom.

13. The improvement of claim 7, including an O-ring carried on said locator pin and fitting closely in said aperture when the locator pin is received therein.

14. A vacuum film holder comprising:

a rigid frame presenting a generally rectangular opening therethrough and having a recessed shelf extending around said opening, said frame having opposite ends on opposite ends of the opening;

a generally rectangular transparent panel having a size to cover said opening with the periphery of the panel received on said shelf;

a vacuum channel extending around said shelf between said frame and the periphery of said panel for applying vacuum to film positioned against said panel, thereby holding the film against the panel;

a groove extending through each end of said frame;

a pair of notches in said panel at locations to align with the respective grooves on opposite sides of the vacuum channel therefrom when the panel is disposed on said shelf;

a pair of plates sized to be received in the respective pairs of grooves and notches to bridge said vacuum channel at the opposite ends of the frame;

a registration pin projecting from each plate; and means for locating each plate in the corresponding groove and notch at a position wherein said registration pins are spaced apart at preselected locations overlying the channel for engaging the film.

15. The film holder of claim 14, wherein said locating means comprises:

a pair of apertures in said frame at locations within said grooves; and a locator pin projecting from each plate in a direction opposite the direction in which the registration pin projects, said locator pins fitting closely in the respective apertures and being disposed to position said registration pins at said preselected locations when the plates are inserted in the grooves and notches with the locator pins entering said apertures.

16. The film holder of claim 15, including:

a second pair of apertures in said frame at locations within said grooves; and a pin member projecting from each plate at a location to enter the corresponding second aperture when the plate is inserted in the groove and notch with the locator pin entering the corresponding aperture in the first mentioned pair.

17. The film holder of claim 15, including an O-ring carried on each locator pin and fitting closely in the corresponding aperture when the locator pin is inserted therein.

18. The film holder of claim 14, including:

a threaded hole in each plate accessible when the plate is in the grooves and notches; and a tool for removing the plates from the grooves and notches, said tool having a threaded shank for threading into the threaded holes to permit the tool to remove the plates from the grooves and notches.

19. The film holder of claim 14, including a screw for securing each registration pin to the corresponding plate in projection therefrom.

* * * * *